United States Patent [19]

Ernstoff et al.

[11] 4,090,219
[45] May 16, 1978

[54] LIQUID CRYSTAL SEQUENTIAL COLOR DISPLAY

[75] Inventors: Michael N. Ernstoff, Los Angeles; William C. Hoffman, Torrance; Richard N. Winner, Palos Verdes Peninsula, all of Calif.

[73] Assignee: Hughes Aircraft Company, Culver City, Calif.

[21] Appl. No.: 690,324

[22] Filed: May 26, 1976

Related U.S. Application Data

[63] Continuation of Ser. No. 530,775, Dec. 9, 1974, abandoned.

[51] Int. Cl.² .............................................. H04N 9/30
[52] U.S. Cl. ...................................................... 358/59
[58] Field of Search ................. 358/59, 58, 61, 56, 358/64, 60; 178/2.82; 350/160 LC

[56] References Cited

U.S. PATENT DOCUMENTS

| | | | |
|---|---|---|---|
| 2,611,817 | 9/1952 | Schwarz | 358/64 |
| 2,731,511 | 1/1956 | Wiesen | 358/58 |
| 2,921,118 | 1/1960 | Benjamin | 358/58 |
| 3,166,635 | 1/1965 | Todt | 358/60 X |
| 3,215,776 | 11/1965 | Hamilton | 178/7.82 |
| 3,511,925 | 1/1966 | Lee et al. | 358/59 |
| 3,569,614 | 3/1971 | Hanlon | 358/56 |
| 3,752,910 | 8/1973 | Lewis | 358/59 |
| 3,821,796 | 6/1974 | Ernstofdd et al. | 358/58 |
| 3,840,695 | 10/1974 | Fischer | 350/61 |
| 3,862,360 | 1/1975 | Dill et al. | 350/160 LC X |
| 3,899,786 | 8/1975 | Greubel et al. | 350/160 LC X |

*Primary Examiner*—Robert L. Griffin
*Assistant Examiner*—Aristotelis M. Psitos
*Attorney, Agent, or Firm*—Walter J. Adam; W. H. MacAllister

[57] ABSTRACT

A liquid crystal field sequential color display is formed by presenting three monochromatic images corresponding to the three primary colors, that is, red, green and blue, consecutively in a repetitive sequence and at a rate greater than the flicker fusion frequency for human vision. Each field contains a monochromatic image showing how the intensity of the primary color to which it corresponds varies over the entire image area. The black and white imaging techniques typically used for forming the intensity pattern for each field are transformed into the required sequential monochromatic image patterns through the use of colored filters in one embodiment or colored light in another embodiment. The novel result is obtained by the combining of flat panel liquid crystal display technology with color display technology. This invention disclosure shows a practical method for combining these techniques into a device that will form a full color image.

5 Claims, 11 Drawing Figures

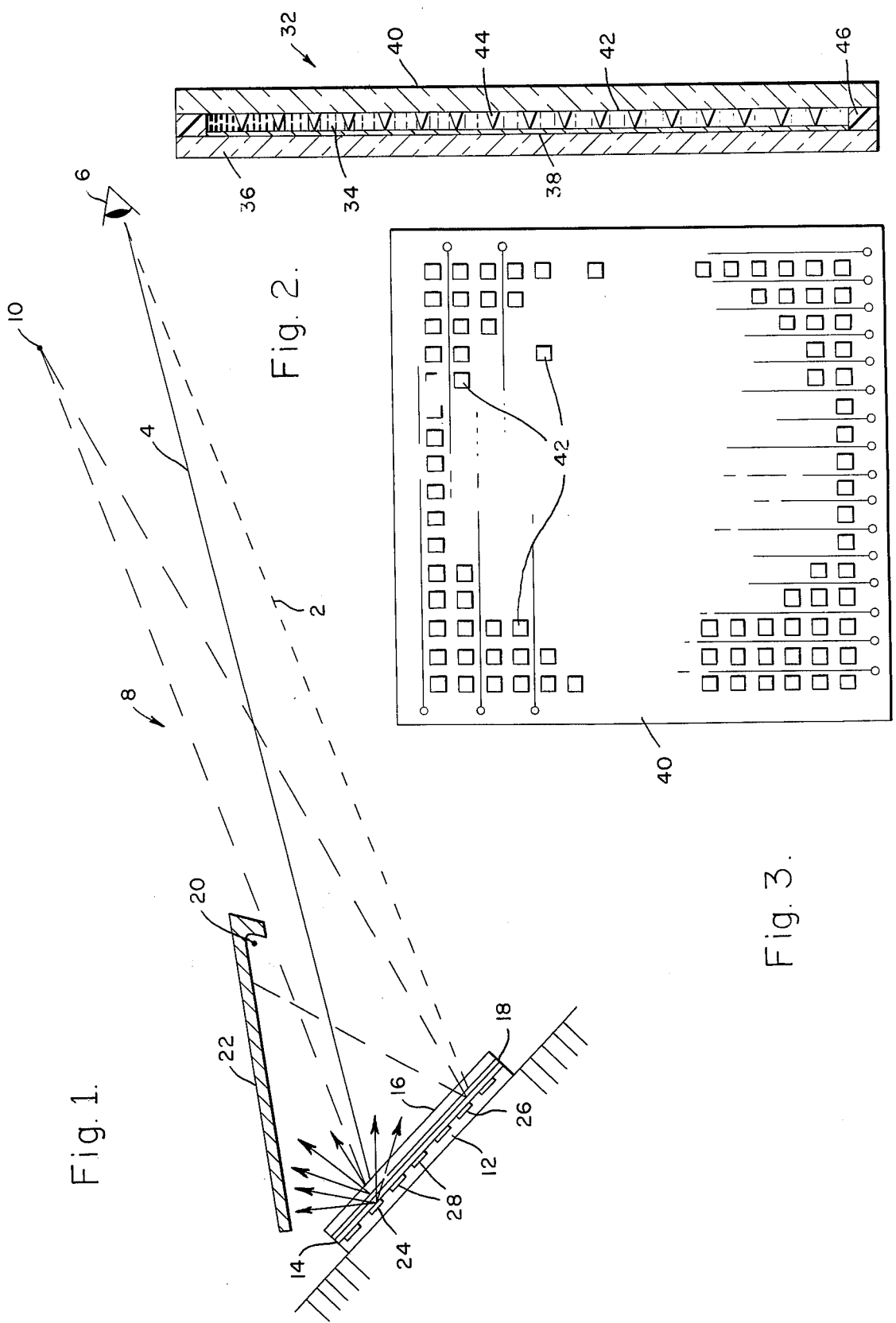

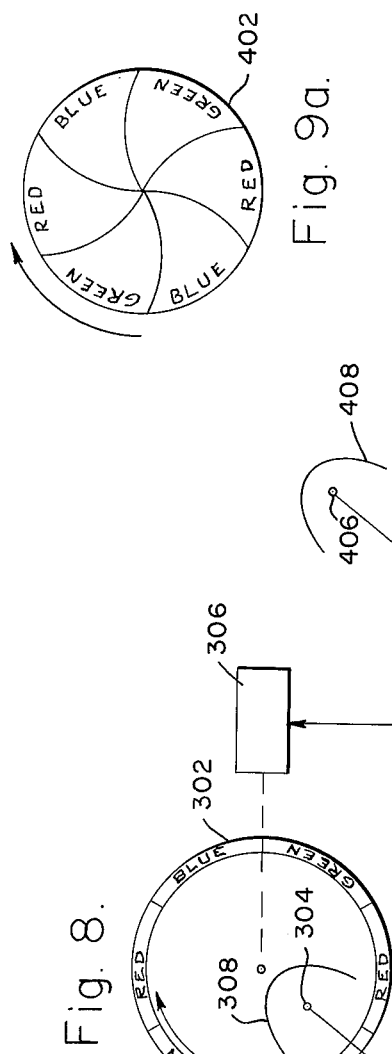
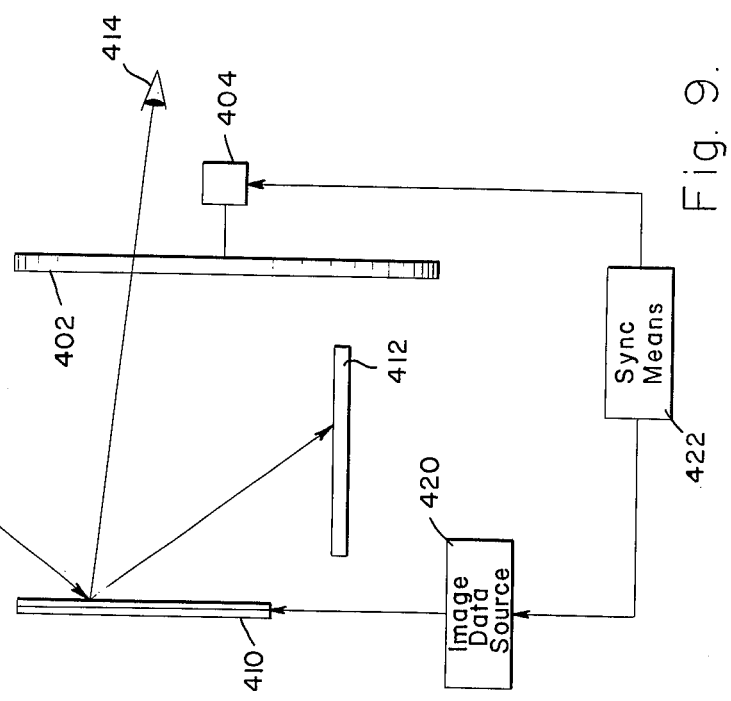
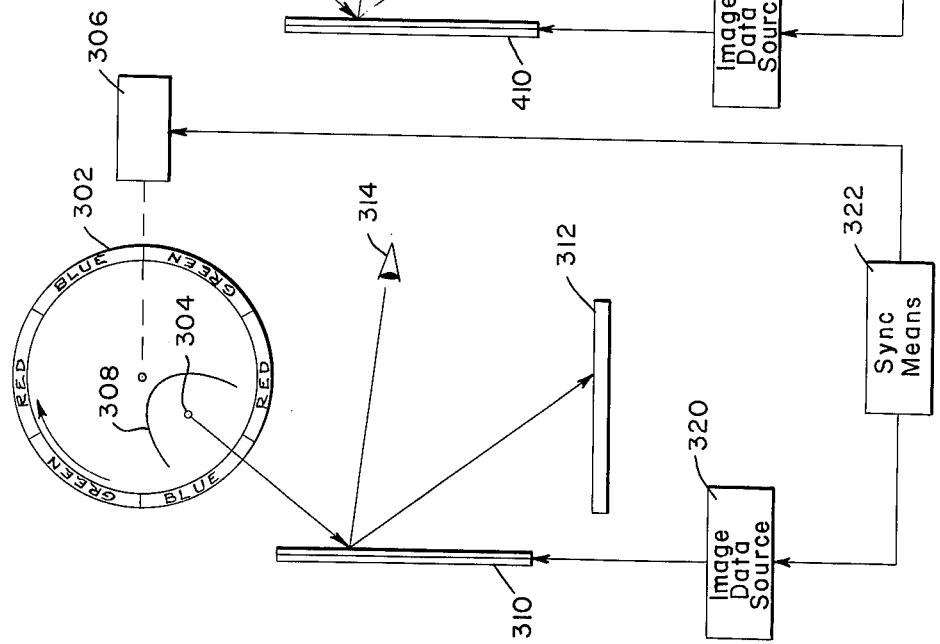
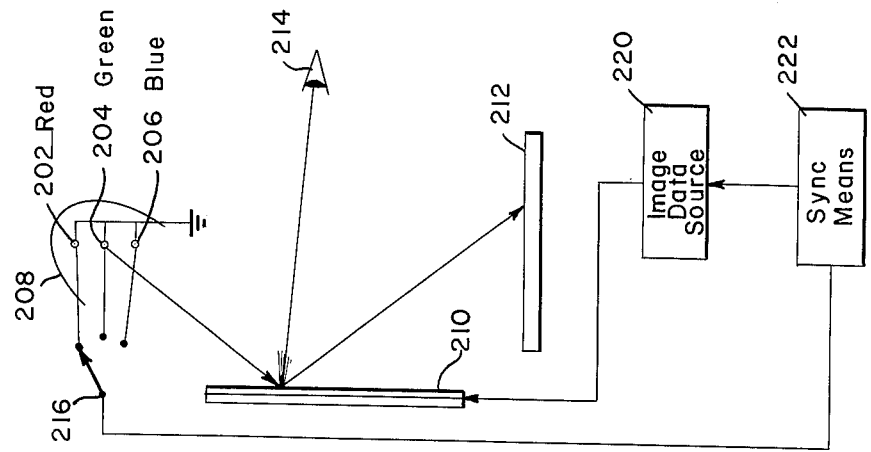

LIQUID CRYSTAL SEQUENTIAL COLOR DISPLAY

REFERENCE TO THE FIRST APPLICATION

This specification constitutes a continuation-in-part of copending patent application, Ser. No. 530,775, filed on Dec. 9, 1974, and now abandoned, for LIQUID CRYSTAL FIELD SEQUENTIAL COLOR DISPLAY of Michael N. Ernstoff et al.

CROSS REFERENCE OF RELATED DISCLOSURES

Ser. No. 352,397, and now U.S. Pat. No. 3,862,360 filed Apr. 18, 1973 by Dill, Ernstoff, Finnila, Hoffman, Leupp and Winner described a method providing the circuitry and fabrication techniques making it practical to produce high resolution liquid crystal display panels that may be programmed at a high rate.

BACKGROUND OF THE INVENTION

1. Field of the Invention

This invention relates to liquid crystal display systems and more particularly to such systems that form a full color image in a field sequential manner.

2. Description of the Prior Art

One prior art display system is described in a patent granted Ernstoff et al U.S. Pat. No. 3,781,465. A high-brightness, field-sequential color television display system utilizing electronically controllable color switching of a tri-color liquid crystal filter positioned in front of a monochrome cathode ray tube is described. For each of the basic red, green and blue colors, a field sequential operation is performed. The color image is formed in the field sequential fashion by placing a spectral filter in front of a cathode ray tube and observing the various intensities of white light on the face of the tube through the composite filter. The composite tri-color liquid crystal filter is placed in front of a raster scanned cathode ray tube with a polarizer included in the filter on the side adjacent to the screen of the cathode ray tube. Each monochromatic field of the field sequential presentation is formed by switching the cells of the tri-color composite filter between a clear state and a colored state, with the cells so switched that for each primary color, two cells are clear and one is colored at any one time.

Another prior art device is described in U.S. Pat. No. 3,783,184 granted to Ernstoff et al. A high brightness, field sequential color television display system utilizing electronically controlled color switching of ferroelectric ceramic wafers is described. The stationary filter provides a color change electronically and color switching is the result of selected retardations of the signals for each of the basic red, green and blue colors so that a rapid field sequential operation is performed. Again, the color image is formed in the field sequential fashion by placing the spectral filter in front of a cathode ray tube and observing the various intensities of white light on the face of the tube through the composite filter. For the light to pass through this composite filter, its initial polarization, after passing through the polarizer, must be rotated by the intermediate structure to the polarization of the analyzer. Wavelengh selection is achieved by using a ferroelectric material having a property to obtain the angle for transmission as a function of the wavelength of each of the basic colors red, green and blue. Electronic control over the wavelength selection mechanization can be achieved by using a ceramic wafer of a selected thickness so that rotation to the angle of transmission is dependent upon the electric field developed across sections of the ceramic wafer by an interdigital finger structure. The color image is achieved by placing the composite filter in front of a cathode ray tube and switching the ceramic wafer in a field sequential fashion and in synchronism with the scan of the cathode ray tube gun upon its display surface. The composite filter is electronically switched in synchronism with each field scan so as to sequentially permit only the red, green or blue components of the white light to pass to the eye of the viewer.

SUMMARY OF THE INVENTION

It is therefore an object of the subject invention to provide an improved full color liquid crystal display system.

Another object is to provide the synchronization techniques which make it practical to produce a full-color display on a liquid crystal display panel by means of a field sequential method.

It is a further object of this invention to provide a high resolution and high brightness full color liquid crystal display system by presentation of sequential color fields.

A still further object of the present invention is to provide a liquid crystal display panel replacement for the shadow mask color cathode ray tube.

Three ways to use a standard flat panel liquid crystal display with large scale integration (LSI) addressing to form full color images are presented. Two of the methods involve switching the color of the illumination source that is used to flood the flat panel liquid crystal display and another arrangement uses a filter through which the display may be viewed. All three arrangements form a color image in a field sequential manner. Each field contains a monochromatic image showing how the intensity of the primary color to which it corresponds varies over the entire image area. In one scheme, three illuminating sources are utilized; each source being of a color corresponding to a different one of the primary colors. In another arrangement, a color switching filter is used in front of a single illuminating source. Still another design uses color filters in front of the display devices. All three arrangements may utilize an element know in the art as a light trap. A theoretically perfect light trap for the application of the present invention would be a surface that completely absorbed all of the visible light incident upon it. A physically realizable practical light trap is here defined as a "good" absorber of that electromagnetic radiation falling within the frequencies comprising the visible spectrum. Such an element may, for example, be a diffuse or dark optical surface providing very poor reflection properties. The flat panel liquid crystal display device is by nature a reflective type of display; it has no internal source of illumination. In the operation of the invention, when an elemental liquid crystal cell is addressed, it first samples the video signal. The amount of scattering and hence the cell brightness is proportional to the level of the video signal sample and it remains approximately constant until another sample is taken in the next frame. It is a feature of liquid crstal display panels that display contrast will not decrease under conditions of high ambient illumination, rather, display contrast will be enhanced under such conditions.

BRIEF DESCRIPTION OF THE DRAWINGS

FIG. 1 is an idealized schematic illustrating the general operating characteristics of a liquid crystal display system.

FIG. 2 is a cross-sectional view of a liquid crystal display panel showing elements of its construction.

FIG. 3 is a plan-sectional view of a liquid crystal panel showing a matrix of reflective electrodes.

FIG. 7 is an idealized schematic diagram illustrating a three-lamp method for forming a field sequential color display.

FIG. 8 is an idealized schematic diagram illustrating a filtered lamp method for forming a field sequential color display.

FIG. 9 is an idealized schematic diagram illustrating a filtered image method for forming a field sequential color display.

FIG. 9a is a plan view of the color wheel illustrated in FIG. 9.

DESCRIPTION OF PREFERRED EMBODIMENTS

Figure 4:
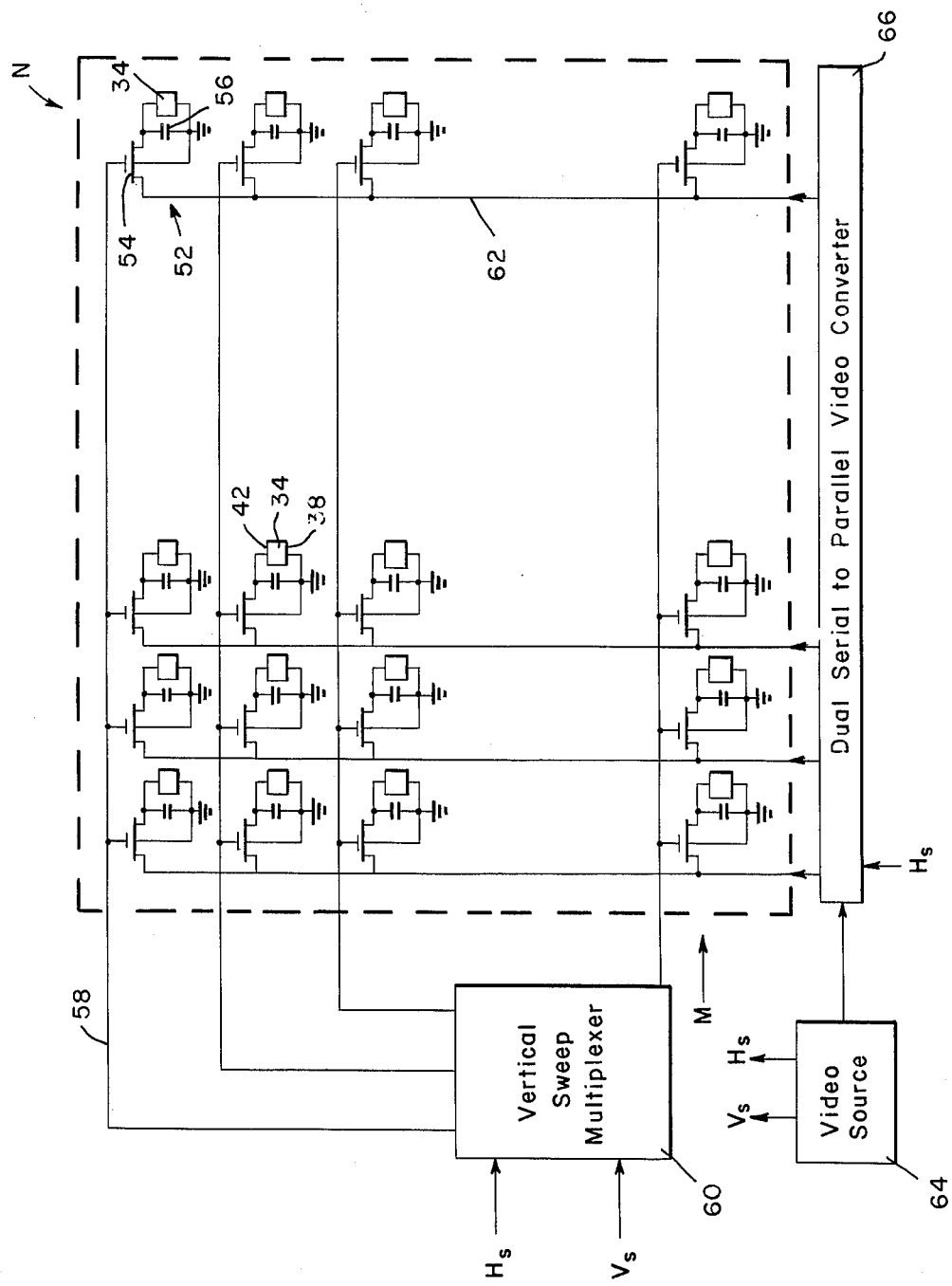
FIG. 4 is a schematic and block diagram useful for describing one addressing format compatible with the display panels of the subject invention.

Referring now more particularly to FIG. 1, a flat panel display system 8 can be formed by sandwiching a thin layer of liquid crystal material 14 between a glass plate 16 with a transparent electrode 18 covering one surface and a back plate 12 with a matrix array of reflecting electrodes 28. The liquid crystal material 14 is normally transparent, but it can be made to scatter incident light with the application of an electric field. By using a matrix of electrodes to set up an electric field with a desired pattern, an image can be formed. The electrodes 28 are controlled by multiple-layered electronic circuits formed in the semiconductor backing plate using large scale integration (LSI) techniques.

The display may be viewed as shown in FIG. 1 under ambient illumination such as a daylight illumination source 10 or a specially furnished light source as at 20. Light from either or both sources incident upon a cell in the off condition as indicated at 26 will be specularly reflected as indicated at 2, thus the observer at 6 will see an image of the light trap 22. If now we consider light incident from either or both sources 10 or 20, incident upon a cell in the on condition as indicated at 24, some of the incident light 4 will be scattered to the observer at 6 rather than an image of the light trap 22. Thus, it may be seen that in a reflective liquid crystal display system an off cell will present a dark image of the light trap to an observer while an on cell will provide scattering and thus appear light. It is to be noted that a liquid crystal cell emits no light of its own, rather, the cell in the on condition, that is, with a correct electric potential applied thereto, creates a light-scattering turbulence in the liquid crystal material. The effect thus described is well known in the art and is discussed in an article entitled, *Liquid Crystal Matrix Displays*, by Bernard J. Lechner et al of RCA Laboratories, David Sarnoff Research Center, Princeton, N.J. The article has been published in Volume 59, No. 11, November 1971 of the Proceedings of the IEEE.

Referring now to FIG. 2, a liquid crystal display panel 32 is formed by sandwiching a thin layer of liquid crystal material 34 between a glass plate 36 which has a transparent electrode 38 covering one surface and a backplate 40 which has a matrix array of reflective electrodes 42 formed thereon. Transparent electrode 38 may be formed by depositing a very thin layer of indium or tin oxide or similar type material on the rear surface of optically flat glass plate 36. The transparent electrode so formed acts as a common electrode for all of the individual cells. Liquid crystal material 34 fills the void formed by spacers 44 between the front glass plate 36 and the back plate 40, such that in the assembled panel the liquid crystal material may be one half to one mil thick, for example. Commonality of the liquid crystal material between cells does not interfere with the operation of the display panel because the high viscosity of the material prevents the scattering centers from migrating significantly before they dissolve. Filling of the panel with liquid crystal material may be accomplished by creating a partial vacuum at one end of the panel through a hole (not shown) in seal 46 and applying the liquid crystal material through a filling hole (not shown) at the opposite end thereof. After the panels have been filled with the liquid crystal material, the filling holes may be "pinched off" or sealed with epoxy.

It is noted that in FIG. 3 the 16 by 16 matrix of elemental cells is shown at approximately 20 times their actual size for clarity of illustration, and that in an actual panel many more elements would be used such as a 1000 by 1000 matrix, for example.

Reference is now directed to the electrical schematic and block diagram of FIG. 4 which illustrates one display panel addressing format which could be used for presenting conventional television-type imagery.

As shown in FIG. 4, the individual liquid crystal cells are arranged in a matrix of $m$, rows and $n$ columns. Associated with each cell, in addition to the liquid crystal material 34 sandwiched between electrodes 38 and 42, is a field effect transistor (FET) which is designated generally by the reference numeral 54 and a capacitor which is designated generally by reference numberal 56. Capacitor 56 and FET 54 form an elemental sample-and-hold circuit which functions to "stretch" addressing pulses, which could be 30 microseconds in duration, for example, to pulses of 1 millisecond duration needed to effectively energize the liquid crystal material. As shown in FIG. 4, each FET is so connected that when the gate is driven negative, the FETs turn on and the associated capacitor 56 is connected to a column electrode bus, such as column electrode bus 62, for example. When the gate drive voltage is removed (the gate-to-drain voltage returns to zero or becomes positive), all capacitors 56 of the corresponding row are disconnected from the column bus by the high off resistance of the field effect transistors. In this manner, each of the capacitors 56 in any given column is separated from the other capacitors in that column. Since the gates of all FETs 54 in any one row are connected together by a gate electrode bus, such as bus 58, for example, the placement of an enable signal on any given gate electrode bus causes all the storage capacitors for that given row to be loaded with video data that are then present on their corresponding column electrode busses.

The synchronous line-at-a-time loading of new video information into all the elements in a given row requires the video information to be present in parallel synchronous form on all the column electrode busses; e.i., the video cannot be scanned or switched from one column to the next as the video on all columns must be simultaneously valid and independent of video on the other columns.

It is noted that contrary to a conventional cathode ray tube system wherein each element is addressed by an electron beam that scans in two directions, the liquid crystal display addressing format of FIG. 4 permits scanning in only one direction. As shown in FIG. 4, vertical sweep multiplexer 60 provides the ordered scan by driving the gate electrode busses. Multiplexer 60 may be implemented by driving the gate electrode busses from the parallel outputs of a shift register, for example. The video signals are applied in the format required for conventional television scanning by means of a dual serial-to-parallel video converter 66.

Considering the vertical sweep multiplexer 60 in more detail, this circuit may consist simply of a serial input, parallel output shift register and associated drivers for each row electrode bus of the display arranged such that a single "one" in a whole field of "zeros" is shifted through the shift register to scan each field. For an exemplary case of a 1024 line display which is refreshed 30 times per second, the basic clock rate of the shift register would be 1024 times 30, or approximately 30 kilohertz. The gate drive voltage change must be greater than the peak-to-peak video drive signal which is applied to the liquid crystal cells 52. In the subject embodiment of the liquid crystal cells, the video swings required to excite the liquid crystal material to maximum scattering capability (maximum brightness) could be approximately 20 volts, for example.

If the FETs have a voltage threshold of 4 volts, for example, the gate voltage drive of 24 volts would be required. If the vertical sweep multiplexer 60 is implemented by means of an LSI shift register, its output voltage would be in the order of 3 to 4 volts and hence the requirement for a driver or buffer amplifier for each row bus. Such a buffer amplifier would have a 24 volt output swing with a sufficiently high-gain bandwidth product and power drive capability to provide a fairly good line drive pulse. Buffer amplifiers or drivers having a slew rate of approximately 10 volts per microsecond when loaded with the characteristic row electrode bus capacitance would provide a satisfactory switching time for applications in which the desired addressing time is approximately 30 microseconds.

Before explaining the operation of the dual serial-to-parallel video converter 66 in greater detail, it may be helpful to first consider the operation of a single serial-to-parallel analog converter. Such a circuit functions in an analogous manner to a conventional serial-to-parallel digital converter with the exception that the magnitude (analog nature) of the signal is preserved. A serial-to-parallel converter takes sequentially presented data and stores it in a series of data bins which can be interrogated in parallel. The simplest serial-to-parallel analog converter consists of a set of sample-and-hold circuits with one sample-and-hold circuit for each of the parallel output channels, and a shift register to sequentially enable the sampling function. Such a circuit can be used to store one line of conventional video data by providing a sample-and-hold circuit for each liquid crystal cell in the display.

Simultaneous examination of the video data requires that there be a long pause in the accumulation (sampling process). Long pauses in the input serial data would be wasteful of the video data channel capability and the available pause between blocks of television-type data is too short for data transfer to the addressing circuits. Therefore, two serial-to-parallel video converters are utilized in the embodiment in FIG. 4 so that the applied video may be continuously processed.

Figure 5:
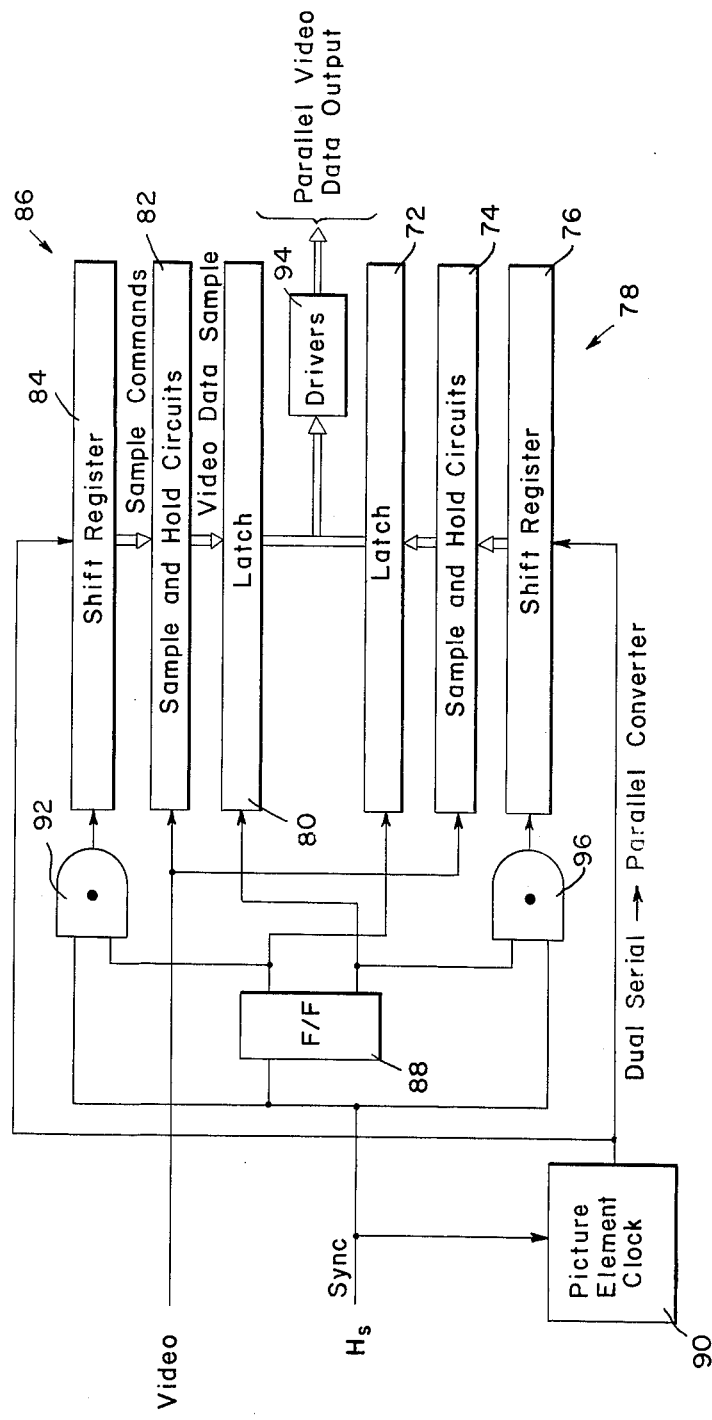
FIG. 5 is a block diagram of a dual serial-to-parallel converter shown in FIG. 4.

One suitable implementation for dual serial-to-parallel converter 66 is shown in FIG. 5. As there illustrated, latch, sample-and-hold, and shift register circuits 72, 74 and 76 respectively, form a first single serial-to-parallel video converter 78, and latch, sample-and-hold and shift register circuits 80, 82 and 84 respectively, form a second single serial-to-parallel video converter 86. Considering single serial-to-parallel video converter 78, a clock source 90 which is synchronized by the horizontal synchronization pulses from video source 64, FIG. 4, and which operates at a rate compatible with the display rate of the liquid crystal panel, clocks the shift register 76 whose outputs control the sampling function of sample-and-hold circuits 74. A flip-flop 88 and gates 96 and 92 control which single parallel video converter 78 or 86 is operably coupled to apply the stored video to the output drivers 94. The flip-flop 88 is toggled by the horizontal sync pulses applied from video sources 64, FIG. 4, and hence successive horizontal lines of applied video is processed by alternate ones of the converters 78 and 86. Latch circuits 72 and 80 are enabled by different ones of the two output circuits of flip-flop 88 such that while one video converter is sampling currently applied horizontal line of data, the other video converter has the output circuits of its latch circuit coupled to the column electrode busses as shown in FIG. 4. In this manner, a continuous feed of video information may be accumulated and while one converter is loading previously accumulated video data into the display in a parallel format, the other converter is accumulating the next line of data.

Figure 6:
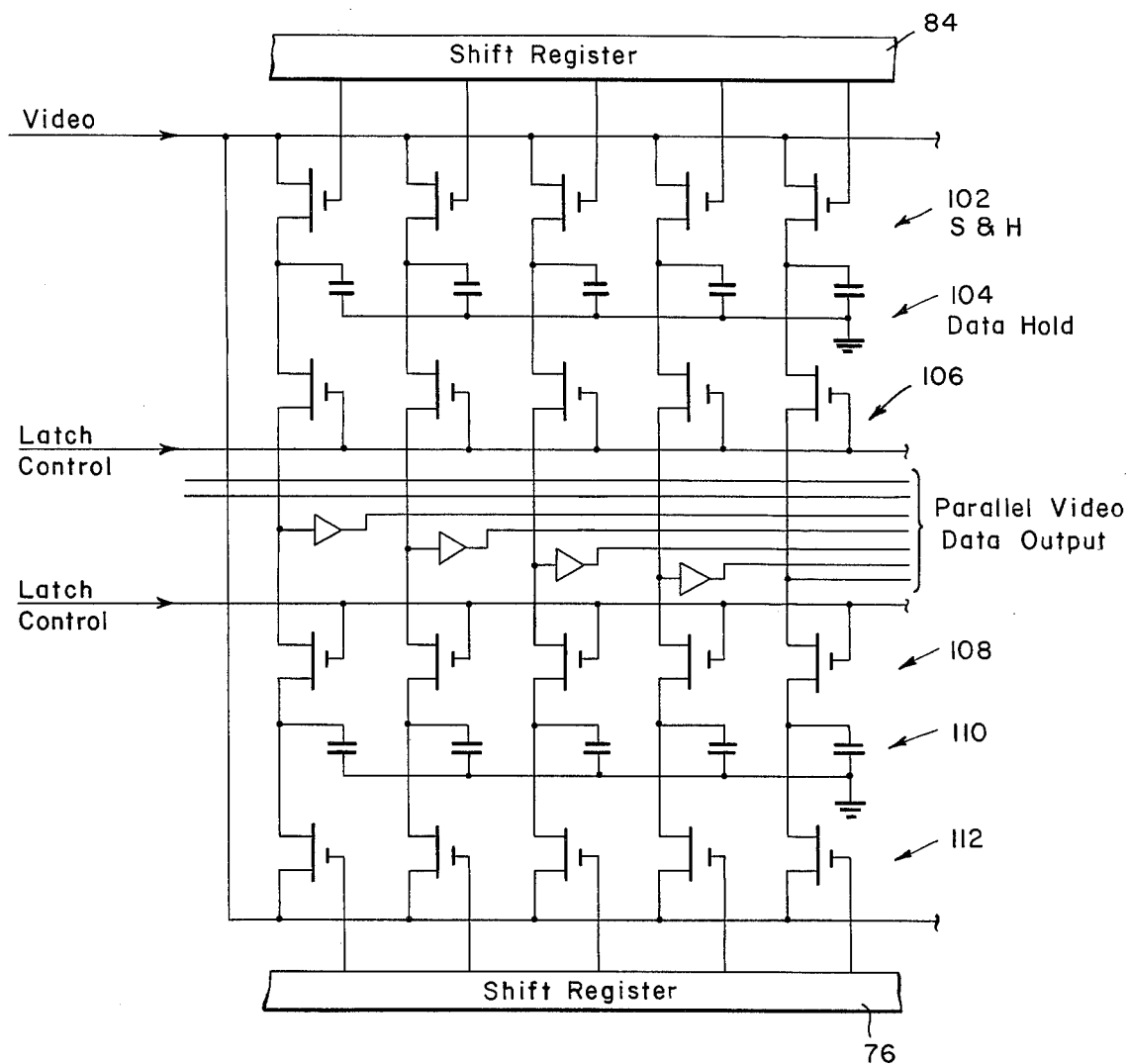
FIG. 6 is a schematic and block diagram of a portion of a converter of FIG. 5.

A portion of dual serial parallel video converter 66 is shown in greater detail in FIG. 6. As there shown, sample and hold circuits 82, FIG. 5, are implemented by FET sampling switches indicated generally by reference numeral 102 and data holding capacitors indicated generally by reference number 104. The operation of the converter is such that the incoming video data are continually sampled at the picture element rate. The dual serial parallel converter 66 alternates the input sampling and data output roles with the transistion between roles taking place during the conventional horizontal retrace period. The input sampling is sequenced by the shift registers 76 and 84 so that the input video data line is sampled by the first sampling switch 102 at the time interval when the video data for the first column is occurring and this procedure is repeated in a similar manner for the data for the following columns. The data holding capacitors, such as 104, are correspondingly connected such that the one containing the information of the first column is connected to the column electrode bus of the first column when the latch circuits are activated, and this procedure is repeated in a similar manner for the other columns. The requirement to accumulate one line of data before new data can be read out in parallel form introduces a converter delay of one line time (typically several microseconds), but this need not degrade system performance. In this manner, continuous feed of video information can be accumulated, while one converter is loading the previously accumulated video data into the display in a parallel format, the other converter is accumulating the next line of data. Single serial-to-parallel converter 78 is implemented by units 112, 110 and 108 shown in the lower portion of FIG. 6, in a manner analogous to that described above for units 102, 104 and 106, respectively.

Again referring primarily to FIG. 4, storage capacitors 56 maintain the potential across the individual liquid crystal cells 34 during the interval of time between when the field effect transistor switches 54 have been turned off, so that another row of cells may be addressed, and the time that the scattering centers are formed in the liquid crystal material. For example, with the liquid crystal material listed here and above there is approximately a 5 millisecond delay, with an applied potential of 20 volts, between when the field is applied across the individual liquid crystal cell and the formation of the scattering centers within the cell. This 5 millisecond delay can be considered as an image developing time and once the scattering centers have been formed, they will remain for a period of approximately 30 milliseconds, for example. The scattering centers retention time could be considered similar to the phosphor persistence in a conventional cathode ray tube system. Hence, if the display is refreshed at a 30 hz rate, the individual cells can be addressed every 33.3 milliseconds, and a new set of scattering centers will be formed almost immediately after the previous set has decayed.

An important aspect of the subject invention relates to the circuitry and fabrication techniques for forming field-effect transistors 54 and capacitors 56 as well as the reflective electrode 42, associated with each cell 52 of the liquid crystal display panel as an integral part of the semiconductor back plate 40 of FIG. 2, to which reference is now again directed. The reflective electrode 42 which contacts the liquid crystal material may be aluminum, nickel, chromium, gold or silver deposited by standard evaporation or sputtering techniques.

Figure 10:
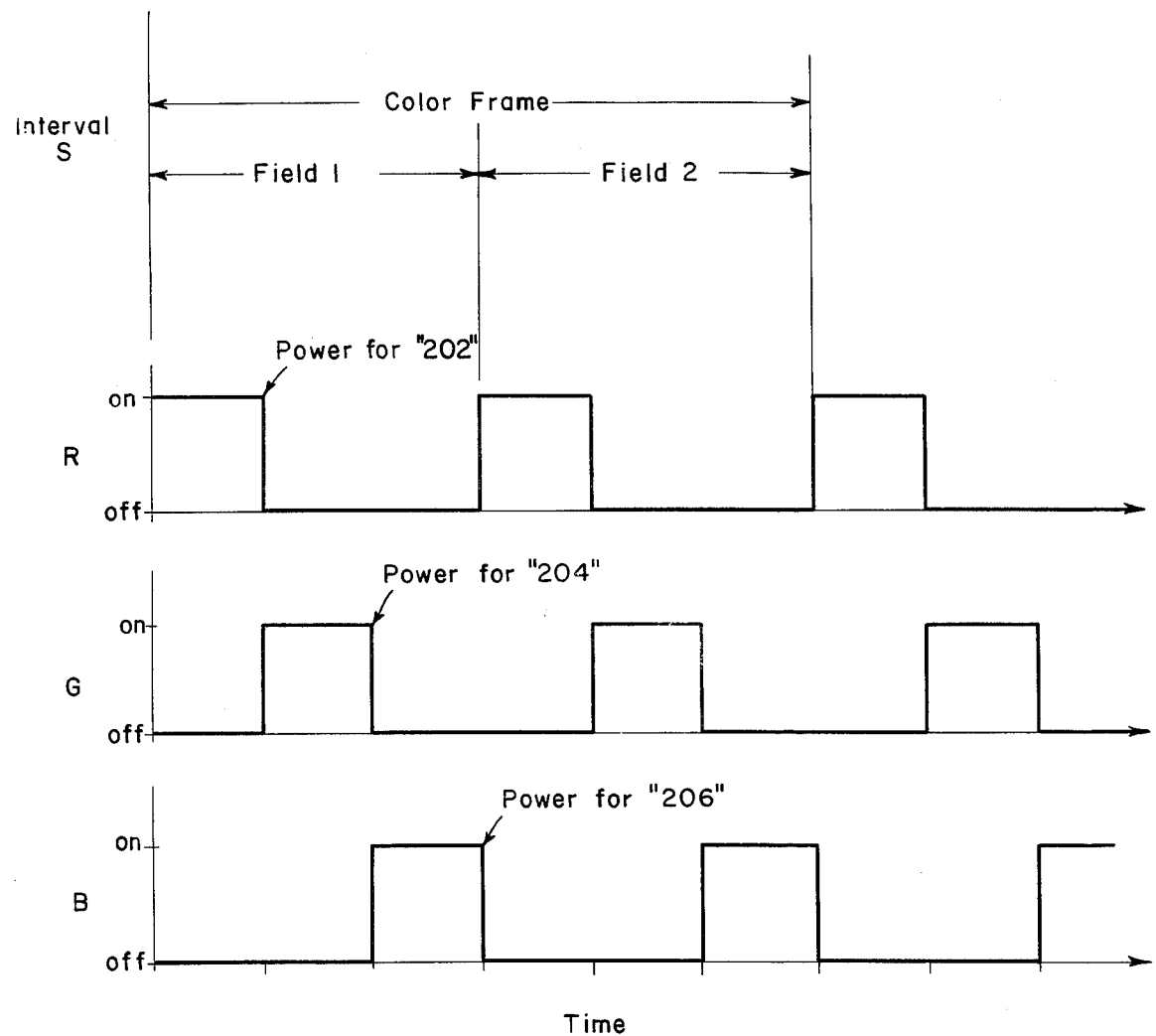
FIG. 10 is a timing diagram beneficial in showing the sequence of events as occurring in the invention as depicted in FIGS. 7, 8 and 9.

Referring now to FIG. 7 and FIG. 8, a method for forming a field sequential color display is illustrated. In FIG. 7, three sources of light are shown with each source corresponding to one of the primary colors. A red source is illustrated at 202, green at 204 and blue at 206. The reflector shown at 208 serves to concentrate most of the light from the sources upon the liquid crystal panel 210. The light sources 202, 204 and 206 which could, for example, be arc lamps or gas discharge tubes, are operated one at a time, in a repetitive sequence by commutation arrangement 216, at a rate such that the complete 3-color sequence is completed more rapidly than the flicker fusion frequency, for example, at least 60 times per second. In FIG. 7, video data are supplied to the liquid crystal panel 210 by image data source 220 which is itself controlled by sync means 222. Sync means 222 also controls switching means 216 supplying power to light sources 202, 204 and 206 in the manner indicated in FIG. 10. Exemplary video data source controls and synchronizing means have been discussed in reference to FIGS. 4, 5 and 6. Typically in some color television systems a color frame interval, as illustrated in FIG. 10, may be about 1/30 of a second and, thus, the color frame rate becomes 30 hz. In the special case of the CBS standard field sequential system, the color frame rate is found to be about 22 hz. The color image is formed by presenting the red color components of the entire image as various intensities on the face of the liquid crystal flat panel display, followed by the green components, and then by the blue components, in a repetitive sequence at a rate above the said flicker fusion rate. The color of the illuminating light is synchronized with the color component of the image being presented on the face of the liquid crystal flat panel display by means of sync means 222. As shown in FIG. 10, power for the red source light 202 is supplied over the first interval shown in curve R, thus, illuminating the red color component of the image being presented on the face of the liquid crystal flat panel display 210. During the next time interval, power for the red source light 202 is turned off as indicated on the curve R and power is supplied to the green source light 204 as indicated on the curve G for the interval indicated, thus, illuminating the green color component of the image being presented on the face of the liquid crystal flat panel display 210. Curve B shows that during the following time interval power is supplied to the blue source light 206, thus, illuminating the blue color component of the image being presented on the face of the liquid crystal flat panel display 210, while reference to curves R and G indicate that the power remains off for these two source lights during this time interval. The sequence of events just described is shown to repeat itself beginning again with the red source light 202 and sequencing individually through the green and blue source lights 204 and 206 respectively to form the second color field indicated as "field 2" on the interval S. As indicated by the interval S of FIG. 10, a complete color frame includes color fields 1 and 2. The observer himself at 214 (FIG. 7) merges the three individual color presentations seen by the eye into a full color image. Specularly reflected light is received in light trap 212.

Problems of flicker and synchronization to eliminate unfavorable conditions resulting therefrom have been studied by E. S. Ferry, American Journal of Science, Volume 44, page 192, 1892 and T. C. Porter, "*Study of flicker,*" Proc. Ray Soc (London) Volume 70, pp, 313–329; July 29, 1902. More recently, Goldmark, Dyer, Piore and Hollywood have performed a study related to color television in Proceedings of the IRE, April 1942, *Color Television — Part I* and Proceedings of the IRE, September 1943, *Color Television — Part II.* These investigators have extended the earlier work of L. Ferry and Porter in developing equipment for color television.

Referring now to FIG. 8 another embodiment for forming a full color field sequential display is illustrated. Only one white light source 304 is provided but the liquid crystal panel 310 is illuminated in a repetitive sequence by red, green and blue light obtained by inserting between the light source 304 and the panel 310, in a repetitive sequence by means of rotating mechanism 306, red, green and blue filters as incorporated into filter drum 302. The reflector shown at 308 serves to concentrate light from source 304 onto filter drum 302. As in the first method presented, the color image is again formed by presenting to the observer at 314, by means of image data source 320, the red color components of the entire image as various intensities on the face of the liquid crystal flat panel display, followed by the green components, and then by the blue components, in a repetitive sequence at a rate above the said flicker fusion rate. As shown in FIG. 8 and FIG. 10, the filter drum 302 is synchronized by means of rotating mechanism 306 and sync means 322 so as to cause the red filter of filter drum 302 to be interposed between source light 304 and liquid crystal display panel 310 during the first interval, identified as "power for 202," shown in curve R, thus, illuminating the red color component of the image being presented on the face of liquid crystal display panel 310. During the next time interval, identified as "power for 204," as indicated on curve G, the synchronization of rotation of filter drum 302 is such that the green filter of filter drum 302 is interposed between source light 304 and liquid crystal display panel 310 so as to illuminate the green color component of the image being presented on the face of liquid crystal display panel 310 with green light. The following time interval, identified as "power for 206," causes blue light to be incident upon the blue color component of the image being presented on the face of liquid crystal display panel 310 as a result of the synchronization of the rotation of filter drum 302 and sync means 322 and as indicated by the first "on" interval shown on curve B as "power for 206." This sequence of events repeats itself during the next field interval "field 2" of intervals S so as to make up a complete color frame. Drum rotation rates have been found to be of the order of 22 to 30 revolutions per second for the six segment drum indicated. Again, the observer himself at 314 merges the three individual color presentations seen by the eye into a full color image. Again, specularly reflected light is incident into light trap 312. Such an arrangement has been examined for use with a cathode ray tube by Goldmark et al (above), but not for use with a full color, sequential field, liquid crystal display panel. In the use of FIGS. 8 and 10 in explaining an embodiment of the invention, the FIG. 10 legends; "power for 202," "power for 204" and "power for 206" should be understood to mean; "inteval during effectivity of red filter of filter drum 302," "interval during effectivity of green filter of filter drum 302" and "interval during effectivity of blue filter of filter drum 302," respectively.

Referring now to FIG. 9, a still additional method for forming a field sequential color display is illustrated, video data are supplied to liquid crystal display panel 410 by image data source 420 which is itself controlled by sync means 222. It will be appreciated that image data source 420 and image data sources 220 and 320 previously discussed, may be any source of field sequential color television signals, such as the CBS laboratories field-sequential color television camera, which are applied to the liquid crystal aray elements utilizing the addressing circuit shown in FIG. 4. While FIGS. 7, 8 and 9 illustrate image data sources which require an external sweep synchronization capability, it will be appreciated that the synchronization may be from either source to display or display to source. Exemplary video data source controls and synchronizing means have been discussed in reference to FIGS. 4, 5 and 6. Filter wheel 402 is situated between viewer 414 and liquid crystal panel 410 illuminated by lamp 406 and reflector 408. Filter wheel 402 is driven by motor 404 and the panel 410 is thus viewed through filters that follow a repetitive sequence from red to green to blue. Filter wheel 402 is driven by motor 404 and sync means 422 at such a speed that the color components appear in a repetitive sequence at a rate above the said flicker fusion rate. The color wheel 402 is synchronously rotated by motor 404 so as to cause the red filter of the filter wheel to be interposed between the observer 414 and the liquid crystal display panel 410 during the first interval shown in curve R, thus showing the observer a red color component of the image being presented on the face of liquid crystal display panel 410. During the next time interval as indicated on curve G, the green filter is interposed between the observer 414 and the liquid crystal display panel 410 by means of the synchronization arrangement so as to present a green color component of the image being presented on the face of liquid crystal display panel 410. The following time interval presents the observer with a blue color component of the image being presented on the face of liquid crystal display panel 410 due to the action of the synchronization motor 404. This time interval is indicated as the first "on" interval shown on curve B. This sequence of events repeats itself during the interval "field 2" of interval S so as to make up a complete color frame. As before, the observer himself at 414 merges the three individual color presentations seen by the eye into a full color imge. The phasing of color wheel 402 is controlled such that the red filter is interposed between the observer and the liquid crystal display during the red data transmission field and so on. The form of filter wheel 402 is further illustrated at FIG. 9a. Specularly reflected light is incident into light trap 412. Again, Goldmark et al have described the generation of filter shapes for applications to cathode ray tube color television, but not for use with a full color, sequential field, liquid crystal display panel. In the use of FIGS. 9 and 10 in the explanation of an embodiment of the invention, the FIG. 10 legends; "power for 202," "power for 204" and "power for 206" should be understood to mean; "interval during effectivity of red filter of filter wheel 402," "interval during effectivity of green filter of filter wheel 402" and "interval during effectivity of blue filter of filter wheel 402," respectively.

Thus, it may be noted in each of the above cases, the color image is formed by presenting the red color components of the entire image as various intensities on the face of the liquid crystal flap panel display, followed by the green components, and then by the blue components, in a respetitive sequence at a rate above the flicker fusion rate. The color of the illuminating light or the filter through which the display is being viewed (depending on the method used) is synchronized with the color component of the image being presented on the face of the liquid crystal flat panel display. Again, the observer merges the three individual color presentations seen by the eye into a full color image.

There has thus been described a solid state field sequential color display system that has the unique feature that for the first time it will make possible the construction of a high resolution panel color display in which the color image is formed without the use of a cathode ray tube. The color image is generated using a reflective liquid crystal display technique and therefore, a display contrast for the filtered image method will not decrease under conditions of high ambient illumination.

What is claimed is:

1. A liquid crystal field sequential color display system for receiving an applied video signal from a video data source and providing a color display to an observer comprising:

liquid crystal display panel means having a multiplicity of liquid crystal cells;

addressing means for selectively energizing individual liquid crystal cells with an applied video signal associated with each of a plurality of primary colors to provide a display pattern for each of said plurality of primary colors characterized by variations in the reflectivity of individual cells over the surface of said display panel;

means for displaying the display pattern associated with each of said plurality of primary colors during repetitive intervals, said means for displaying including means for providing illumination of said liquid crystal display panel by each of said primary colors; and means for synchronizing the display pattern associated with each of said primary colors with the illumination of said display panel by the associated primary color.

2. A liquid crystal field sequential color display system for receiving an applied video signal from an image data source and providing a color display to an observer comprising:

liquid crystal display panel means having a multiplicity of liquid crystal cells;

addressing means for selectively energizing individual liquid crystal cells with an applied video signal associated with each of a plurality of primary colors to provide a display pattern for each of said plurality of primary colors characterized by variations in the reflectively of individual cells over the surface of said display panel means;

illumination means for sequentially illuminating said display panel means with each of said primary colors during a plurality of color frame intervals, one of said primary colors occurring during each color frame interval; and means for synchronizing the color frame intervals during which each primary color illumination is incident upon the liquid crystal display panel means with said addressing means.

3. The system of claim 2 wherein said illumination means comprises:

three secondary illuminating sources each of which emits a color of light corresponding to one of the three primary colors; and a reflector directing said illumination from said secondary sources in the direction of said liquid crystal display panel.

4. A liquid crystal field sequential color display system as recited in claim 2 wherein said illumination means comprises a source of light and a color filter drum in rotational relationship to said source of light with the color filters interposed between said display panel and said source of light.

5. The display system of claim 2 further including light trap means positioned to absorb light specularly reflected from the liquid crystal display panel means.

* * * * *